Dec. 3, 1940.    T. H. MILLER    2,223,999
PROCESS AND APPARATUS FOR PURIFYING LIQUIDS DELETERIOUSLY AFFECTED BY AIR
Filed July 17, 1939    2 Sheets—Sheet 1

WITNESS:
Robt. R. Mitchel.

INVENTOR
Theodore H. Miller
BY
Busser and Harding
ATTORNEYS.

Dec. 3, 1940.    T. H. MILLER    2,223,999
PROCESS AND APPARATUS FOR PURIFYING LIQUIDS DELETERIOUSLY AFFECTED BY AIR
Filed July 17, 1939    2 Sheets-Sheet 2

WITNESS:

INVENTOR
Theodore H. Miller
BY
Busser and Harding
ATTORNEYS.

Patented Dec. 3, 1940

2,223,999

UNITED STATES PATENT OFFICE 2,223,999

PROCESS AND APPARATUS FOR PURIFYING LIQUIDS DELETERIOUSLY AFFECTED BY AIR

Theodore H. Miller, Poughkeepsie, N. Y., assignor to The De Laval Separator Company, New York, N. Y., a corporation of New Jersey Application July 17, 1939, Serial No. 284,929

7 Claims. (Cl. 233—18)

My invention has for its object the removal of liquid impurities from liquids that are deleteriously affected by mixture or contact with air. One example of such liquids is the oil from "conservator" or "inert air" transformers which, if allowed to mix with or come in contact with air, will absorb therefrom oxygen that will afterward cause sludging in the oil and may cause corrosion of metal parts of the transformer.

My invention comprises an improved process and apparatus for accomplishing this object.

The necessity for exclusion of air is a requirement particularly well met by "air tight" purifiers of the types shown in various U. S. patents, of which Nos. 1,101,548, 2,002,954, and 2,043,350 are examples, in which the liquid being purified is in completely enclosed spaces from the time it leaves one tank until it enters another one or returns to the same one.

This type of centrifuge has no inherent control in the bowl, such as there is in an ordinary open discharge centrifuge for this work, that will cause a cessation of discharge from the outlet for either the light or the heavy constituent if there is none of that constituent in the mixture being fed to the purifier.

In the "air tight" centrifuges the ratio between the discharges from the two outlets must be regulated by throttle valves that control the back pressure on one or both outlets.

It is known that if, from a large quantity of oil containing a small proportion of water, there are separated all the water with a small quantity of oil, the water will gather together in such large drops that it will quickly separate by gravity if allowed to remain quiescent for a short time.

I have found that, if I connect a liberal size pipe, from the heavy constituent outlet of a centrifugal purifier, to a gravity separation tank containing a float that will sink in oil but float on water and so connected with a drain in the bottom of the tank that it will open it when the tank is more than half full of water and close it when less than half full, and provide a small by-pass from the top of the tank to the inlet to the pump feeding the purifier, I can operate continuously. Whatever water is in the oil being treated will be separated in the purifier and flow to the gravity separation tank from which it will be discharged by the float controlled valve. A small quantity of oil will flow with the water to the tank and thence through the by-pass to the inlet to the pump where it will be returned to the system. If there is no water in the oil being treated there will be only oil circulating from the water outlet from the purifier to and through the tank and the by-pass to the pump. This stream of oil will carry with it to the tank any water that may be subsequently separated from later quantities of oil.

I have also found that instead of the gravity separation tank I may use a centrifuge having a closed outlet for the lighter constituent and an open outlet for the heavy constituent. Because any heavy constituent that reaches this centrifuge has been once separated from the lighter constituent, a major part of it can be easily reseparated in a centrifuge of low efficiency, and because all light constituent from this centrifuge is repassed through the main centrifuge there is no need for a perfect separation of the heavier constituent from the light constituent.

Figure 1:
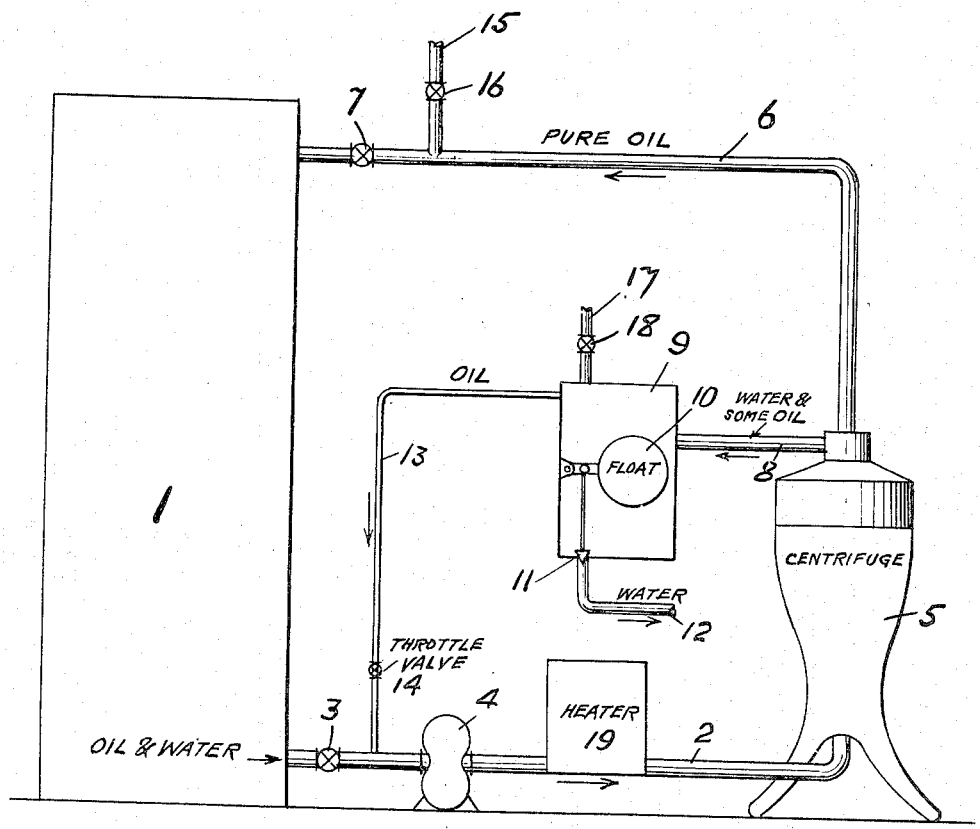
Fig. 1 is a flow sheet of an apparatus using a gravity separation tank for the secondary separation.

Referring first to Fig. 1: 1 is the enclosure for a transformer or other device, containing liquid to be purified, from which a pipe 2 leads through a valve 3 and a pump 4 to a centrifugal purifier 5, in which the liquid being treated is completely enclosed from the air.

From the top of the purifier a pipe 6, with a valve 7, conducts the separated purified liquid back to the top of the tank 1. From the top of the purifier another pipe 8 conducts separated heavier liquid, containing some lighter liquid, to a gravity separation tank 9 having therein a float 10 which, as it rises or falls, opens or closes a valve 11 at the entrance to a heavy liquid outlet pipe 12. From the top of the tank 9 a small pipe 13 with a valve 14 leads back to the pipe 2 between the valve 3 and the pump 4. Pipe 15 with valve 16 and pipe 17 with valve 18 are provided to permit escape of air from the system when starting. A heater 19 is provided for use if the liquid from the tank 1 is too cold for efficient purification.

Figure 2:
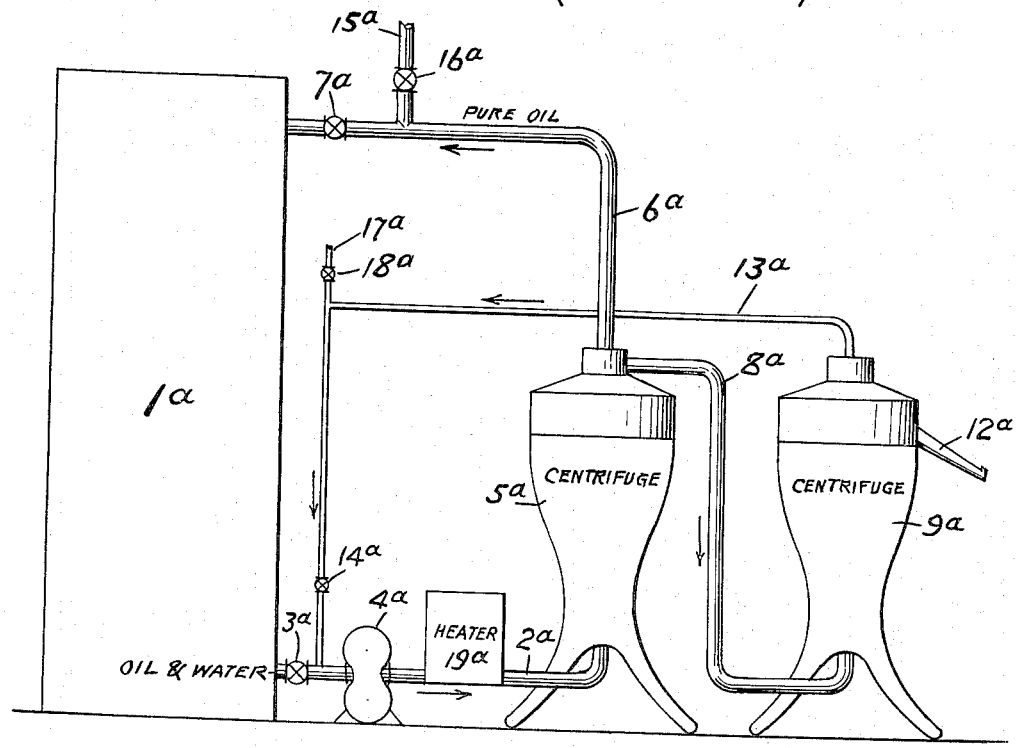
Fig. 2 is a flow sheet of an apparatus using a centrifugal separator for the secondary separation.

Referring next to Fig. 2: The elements in Fig. 2 corresponding to those of Fig. 1 are similarly numbered, the reference numerals, however, being followed by the reference letter a. The apparatus shown in Fig. 2 is the same as that of Fig. 1 except that instead of the gravity separation tank 9 with outlets 12 for water and 13 for oil, there has been substituted a centrifuge 9a with spout 12a for water and pipe 13a for oil.

Figure 3:
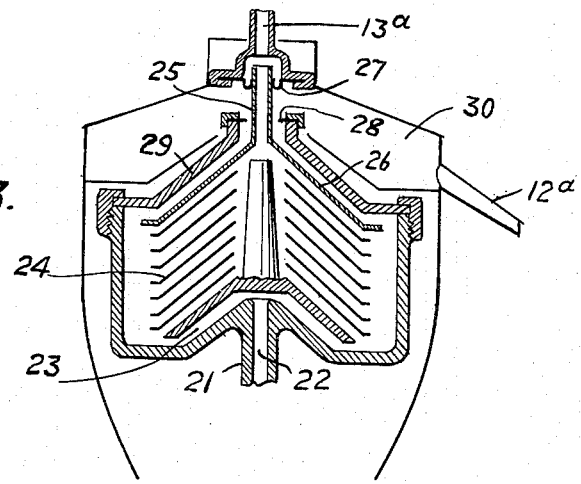
Fig. 3 is a vertical cross-sectional view of a centrifugal bowl suitable for use to accomplish the secondary separation.

Referring next to Fig. 3; which is a vertical sectional view of the centrifuge 9a: The spindle 21, by which the bowl is supported and driven, has a central passage 22 through which the liquids from pipe 8a are fed. Passages 23 lead from the passage 22 to the outer part of the bowl whence the liquids flow into the spaces between the discs 24 where the actual separation takes place. 25 is the outlet tube from the bowl for the lighter constituent from below the top disc 26. 27 is a seal that makes a gas and liquid tight connection between the rotating outlet tube and the stationary pipe 13a. 28 is a control weir over which the heavy constituent escapes from between the top disc 26 and the bowl top 29 into a collecting cover 30 discharging through the spout 12a.

While the process and apparatus are applicable for the purification of many liquids containing heavier impurities, both liquid and solid, I will describe it as applied to the purification of insulating oil, from a transformer of the "conservator" or "inert air" type, containing water and solid impurities.

Assuming that the apparatus of Fig. 1 is used to practice the process: When it is desired to purify the oil in the transformer 1 the pump 4 is started and the valve 3 opened slightly to slowly fill the system with oil, while the air escapes through valves 16 and 18. The pump is then stopped, the valves 3, 16 and 18 are closed, and the machine is brought up to full speed, whereupon the valve 3 can be opened and the pump 4 started to circulate oil through the system.

As the oil from pipe 2 passes through the purifier 5 all water and heavy solid dirt are thrown out and the purified oil is returned through the pipe 6 to the transformer 1. The heavy solids are retained in the purifier bowl while the water and a little oil flow to the gravity separating tank 9. Here the water settles to the bottom, while a small stream of oil flows through the pipe 13, at a rate controlled by the valve 14, back to the pipe 2 at the suction side of the pump 4. When enough water has collected in the tank 9 it raises the float 10, which opens the valve 11 and allows the water to escape through the pipe 12. If water ceases to flow from the purifier, valve 11 closes but the oil escaping through pipe 13 maintains a stream that will carry any subsequently separated water to tank 9 to cause operation of the float and valve.

The operation of the apparatus shown in Fig. 2 is the same as that shown in Fig. 1 except that instead of the gravity tank and float-operated valve a centrifuge is used.

Calculations by formulae well known to and constantly used by designers of centrifugal separators and on which the formula given in Snyder Patent No. 1,283,343 of Oct. 29, 1918 was based, show that, with a light constituent having a specific gravity .9 of that of the heavy constituent, a bowl of the type shown in Fig. 3, less than 7" diameter and revolving 7200 R. P. M., can be so designed that it will be impossible for any appreciable quantity of heavy constituent to escape with the light constituent and in which a back pressure of more than 15 lbs. per square inch in the pipe 13a will be required to cause light constituent to flow out with the heavy constituent.

What I claim and desire to protect by Letters Patent is:

1. That process for removing impurities from liquids which are deleteriously affected by contact with air which comprises establishing a flowing main stream from a body of liquid containing such impurities to a body of purified liquid, centrifugally separating from such stream a smaller stream containing impurities with some liquid, separating a major portion of the impurities from the smaller stream and returning the remainder of the smaller stream to, and mixing it with, the impure liquid to be subjected to said centrifugal separation, and maintaining completely enclosed against admission of air all streams containing substantially any of such liquid while flowing toward and away from said loci of separation and during separation.

2. That process for removing impurities from liquids which are deleteriously affected by contact with air which comprises establishing a flowing main stream from a body of liquid containing such impurities to a body of purified liquid, centrifugally separating from such stream a smaller stream containing impurities with some liquid, separating a major portion of the impurities from the smaller stream and returning the remainder of the smaller stream to the main stream at a point therein between the body of impure liquid and the locus of centrifugal separation, and maintaining completely enclosed against admission of air all streams containing substantially any of such liquid while flowing toward and away from said loci of separation and during separation.

3. The process of removing impurities from liquids which comprises establishing a flowing stream from a body of liquid containing such impurities to a locus of centrifugal separation and at said locus separating purified liquid from impurities containing some liquid, conveying such separated purified liquid from the locus of centrifugal separation in a second stream to a body of purified liquid, conveying said separated impurities containing some liquid in a third stream to a second locus of separation and thereat separating the bulk of the impurities from the liquid, and conveying the liquid last specified with any impurities contained therein from the second locus of separation in a fourth stream to, and mixing it with, the impure liquid to be subjected to said centrifugal separation, and maintaining completely enclosed against admission of air all streams containing substantially any of such liquid while flowing toward and away from said loci of separation and during separation.

4. Apparatus for purifying liquids comprising a centrifugal purifier, a conduit through which a stream of impure liquid is adapted to be conducted from a body thereof to said purifier, said centrifugal purifier being adapted to separate heavy impurities with some liquid from the liquid to be purified and separately discharge a major stream of purified liquid and a minor stream of liquid and impurities, a conduit adapted to conduct said major stream to a body of purified liquid, a separator adapted to separate impurities from said minor stream, a conduit adapted to convey the remainder of said minor stream to the impure liquid to be subjected to centrifugal purification, and means completely closing from the atmosphere said purifier, said separator and said conduits, thereby maintaining gas-free the impure liquid flowing to the purifier, the liquid being purified, both streams of liquid flowing from the purifier, the liquid being separated in the separator and the liquid flowing from the separator to the first named stream of impure liquid.

5. Apparatus for purifying liquids comprising a source of supply of impure liquid, a receiver for purified liquid, a centrifugal purifier adapted to separate purified liquid from impurities containing some liquid, a second purifier adapted to separate impurities from liquid containing some impurities, and a closed system comprising a closed conduit for impure liquid affording air tight communication between said source and said centrifugal purifier, a closed conduit for separated purified liquid affording air tight communication between said centrifugal purifier and said receiver, a closed conduit for separated impurities affording air tight communication between said centrifugal purifier and said second purifier, an outlet for impurities from the second purifier, and a closed conduit affording air tight communication for liquid separated from impurities between the second purifier and the first named conduit, thereby maintaining the said liquids flowing through all said conduits and the liquids being purified free from contamination by air.

6. The combination of a centrifugal purifier having an inlet, closed to the atmosphere, for impure liquid, an outlet, closed to the atmosphere, for purified liquid and an outlet, closed to the atmosphere, for liquid impurities, a pump and conduit, closed to the atmosphere, for feeding to said centrifugal purifier liquid to be purified, a separation chamber in closed communication with the outlet for liquid impurities from said centrifugal separator, a throttled passage from the top of said chamber in closed communication with the suction side of said pump, and a float-controlled opening from the bottom of said chamber.

7. The combination of a centrifugal purifier having an inlet, closed to the atmosphere, for impure liquid, an outlet, closed to the atmosphere, for purified liquid and an outlet, closed to the atmosphere, for liquid impurities, a pump and conduit, closed to the atmosphere, for feeding to said centrifugal purifier liquid to be purified, a second centrifugal purifier having an inlet in closed communication with the outlet for liquid impurities from the first purifier, an outlet for heavier separated constituent and an outlet for separated lighter constituent, and a throttled passage from the last named outlet in closed communication with the suction side of said pump, thereby maintaining the said liquids flowing to, through and from the first purifier and to and through the second purifier and through said passage free from contamination by air.

THEODORE H. MILLER.